United States Patent
Wetzel et al.

(10) Patent No.: US 6,594,371 B2
(45) Date of Patent: Jul. 15, 2003

(54) MICROPHONE BOOM ASSEMBLY

(76) Inventors: Don Wetzel, 1368-A Poinsettia Ave., Vista, CA (US) 92803; Manfred Klemme, 386 S. Burnside #6B, Los Angeles, CA (US) 90036

( * ) Notice: Subject to any disclaimer, the term of this patent is extended or adjusted under 35 U.S.C. 154(b) by 0 days.

(21) Appl. No.: 09/777,160

(22) Filed: Feb. 5, 2001

(65) Prior Publication Data

US 2002/0106098 A1 Aug. 8, 2002

(51) Int. Cl.[7] ............................................. H04R 25/00
(52) U.S. Cl. ..................................... 381/362; 381/361
(58) Field of Search ............................... 381/361, 362, 381/363, FOR 148, FOR 147; 224/201, 185, 200

(56) References Cited

U.S. PATENT DOCUMENTS 4,206,983 A * 6/1980 Nettman ..................... 224/201
5,454,042 A * 9/1995 Drever ......................... 381/382

* cited by examiner

Primary Examiner—Huyen Le
(74) Attorney, Agent, or Firm—Marcia A. Devon

(57) ABSTRACT

An articulated telescopic microphone boom assembly is disclosed. The articulated telescopic microphone boom assembly includes a first hollow cylindrical telescoping boom attached to a hollow hinge assembly providing articulation with a second hollow cylindrical telescoping boom. The hollow hinge assembly includes a locking mechanism to fix the first hollow cylindrical telescoping boom at several predetermined angles in relation to the second hollow cylindrical telescoping boom. The first and second hollow cylindrical telescoping booms are each extended in a telescopic fashion and are fixed into place at a desired length. A microphone coupling means is secured to the one end of one of the cylindrical telescoping booms. An audio cable assembly is ensleeved within the articulated telescopic microphone boom assembly. The audio cable assembly male audio coupler is mounted in the handle and the audio cable assembly female audio coupler is mounted in the microphone coupling means. A handle is attached to one end of one of the hollow cylindrical telescoping booms.

10 Claims, 5 Drawing Sheets

MICROPHONE BOOM ASSEMBLY

BACKGROUND OF THE INVENTION

1. Field of the Invention

The present invention relates generally to devices which suspend and position a microphone.

2. Description of the Prior Art

In the film and broadcasting industries, a microphone is typically mounted on a boom pole located above the person speaking. The quality of reception for most microphones is dependant on the direction of the microphone. Consequently, recording speech requires that the microphone be positioned as close to the speaker as possible and in the proper orientation. The microphone, the boom pole and its operator must be located out of the view of the camera. When a different person speaks or as the speaker moves, the microphone boom operator must be able to rapidly reposition the microphone for optimal reception.

In general, there are two basic types of microphone boom poles. The first type of microphone boom is a production studio boom. The studio has a boom mounted on a support mast extending vertically from a carriage. The microphone is rotatably attached at the end of the boom. The carriage-type boom is large, difficult to move, and only suitable for a studio environment.

The second type is a hand-held boom often referred to as a "fish pole" boom. The hand-held type boom is held and guided by a single boom operator who positions and orients the fixed microphone mounted at the end of the boom. An advantage of the fish pole design compared to the studio boom is that the fish pole design is the relative ease and speed that a skilled operator can manipulate the microphone locations quickly and easily. Unlike the studio boom design, the boom can be rapidly relocated.

U. S. Pat. No. 4,748,671, discloses a communication headset with a hinge between the microphone and the ear piece, so that the microphone can be adjusted by the user who is, for example, using a telephone. The present invention is intended for motion picture or television production where the producer's goal is to capture the speaker's words and image without filling the microphone. The device disclosed in U.S. Pat. No. 4,748,671 is not intended for, and would not be operable for filming and broadcasting applications.

The primary objectives of the present invention are to provide a light weight, audio boom pole which: (1) permits the operator to rapidly and quietly adjust the angle of boom and the microphone in a number of positions, (2) locks the boom at the desired angle so that it is can be easily and quietly operated by a single operator over an extended period of time and (3) may be collapsed for portability. The microphone must be adjustable from a remote, out-of-camera view location and properly oriented to pick up the dialogue without generating any additional sound.

SUMMARY OF THE INVENTION

The present invention is a microphone boom assembly capable of articulation around a pivot joint for precise microphone orientation. The microphone boom assembly includes two cylindrical booms connected to each other. Each boom has a hollow interior for receiving the microphone cord. The booms are extended in a telescopic manner such that the boom is long enough for the operator to stand back outside camera range. A handle is attached to the gripping end of the first boom.

A hinged joint assembly connects the first and second booms. The hinge assembly is hollow and includes two halves, one for receiving each boom pole. Each half of the hinge is pivotally connected to the other. The hinge assembly includes a locking mechanism to secure the desired angle between the two booms and to set the orientation of the booms relative to each other.

Each of the two booms include several sections of concentric pipes with diminishing diameters which are slidably fitted into each other to provide the telescoping feature. A tightening collar is affixed to the end of each section of pipes to provide a locking mechanism so that the user can set the length of each boom.

The end of each outside pipe section of the boom has external male straight threading which is received by the female threading of the next section. Each tightening collar has a collet. When the internal female threading of the collar is tightened onto the external male straight threading of the outside pipe, and the tightening collar is compressed the captive collet against the outer surface of the inside pipe securing the ensleeved inside pipe to the outside pipe at the selected boom length.

Each tightening collar has a dimpled outer surface. The dimpled outer surface is shaped and placed to limit the torque in the tightening or clockwise direction and increase grip torque in the loosening or counterclockwise direction, thus preventing over-torquing of the tightening collar.

The locking mechanism of the hinge assembly preferably includes a locking detent pivotally attached within the hollow hinge assembly. Several detent-receiving slots are arrayed on a portion of the hollow hinge assembly to provide a number of predetermined articulated hinge-locking angles. The locking detent is pivotally biased by a spring to engage an individual detent-receiving slot. The hinge assembly is thereby locked into place and the entire microphone boom assembly is set at a predetermined articulated angle. To change the orientation of the two booms relative to each other, the detent is released from its slot, permitting movement of the two booms. The present invention provides a range of articulation and a locking mechanism not previously attainable with the conventional "fish pole" type booms.

DETAILED DESCRIPTION OF THE PREFERRED EMBODIMENT

Figure 1:
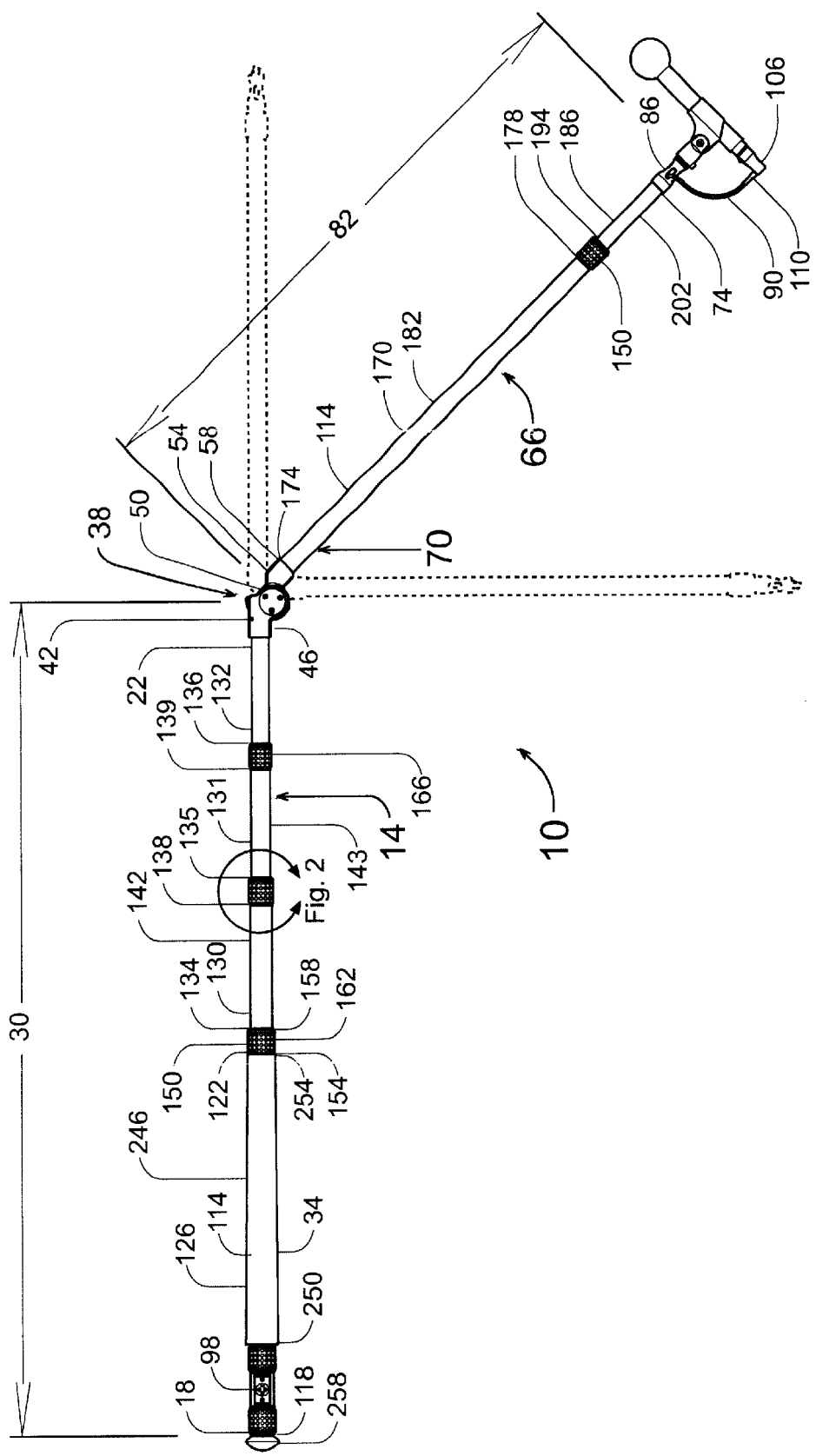
FIG. 1 is an orthographic view of the present invention.
Figure 3:
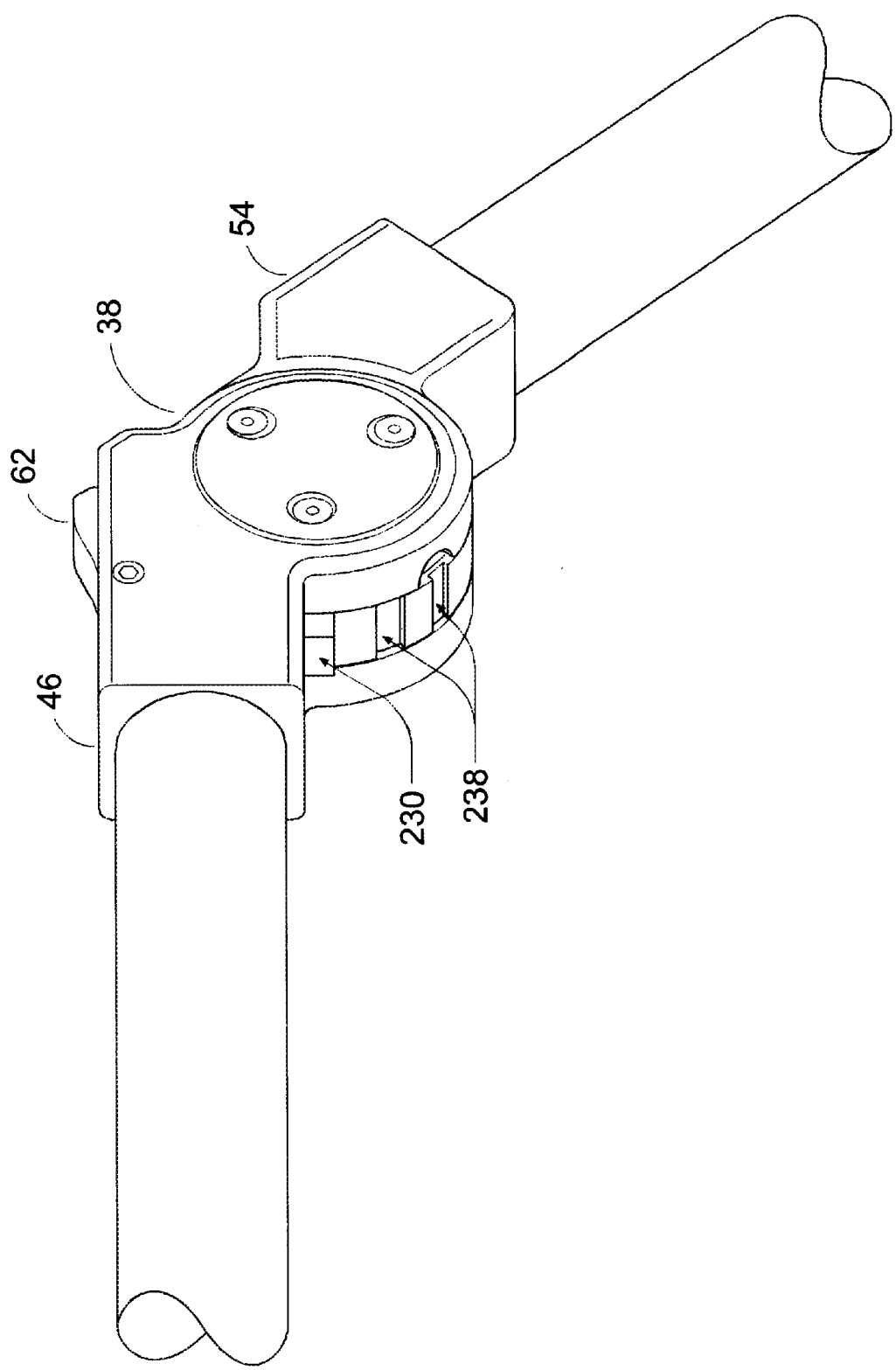
FIG. 3 is a perspective view of the articulated joint of the present invention.
Figure 4:
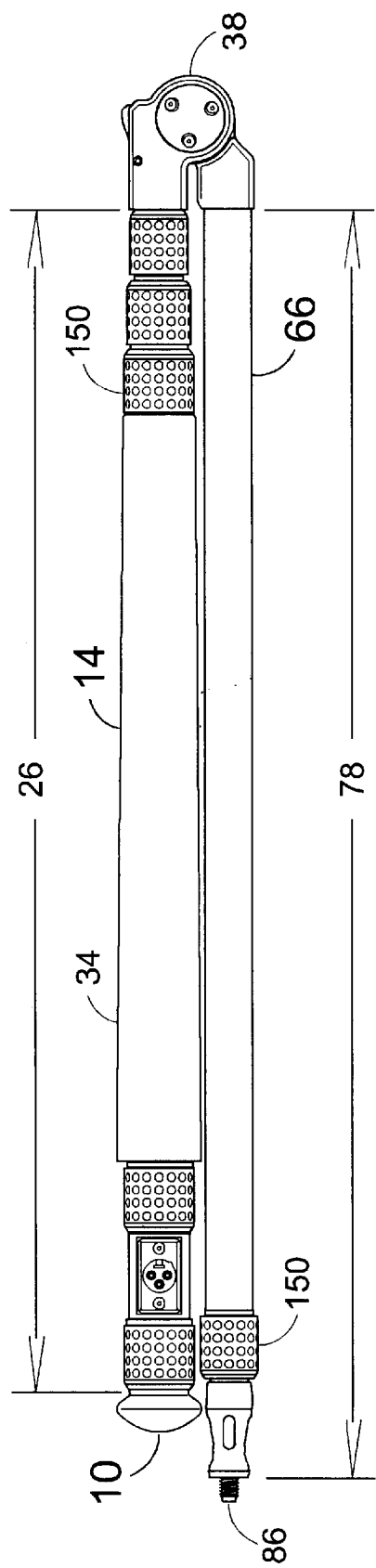
FIG. 4 is an orthographic view of the present invention shown in its collapsible position for carrying.

As shown in FIG. 1, the invention is an articulated telescopic microphone boom assembly 10. The articulated telescopic microphone boom assembly 10 includes two boom poles 14 and 66. The first boom 14 has a first end 18, a second end 22 and a hollow interior. The first boom 14 may be extended in a telescopic fashion from a most contracted length 26 to an extended length 30. The handle portion 34 (shown in FIG. 4) is attached to the first end 18 of the first boom 14. A hollow hinge assembly 38 joins the first boom 14 and the second boom 66. Referring to FIG. 3, the hinge assembly 38 includes two half pieces 46 and 54 pivotally connected to each other. In the preferred embodiment, the hinge assembly includes a detent locking mechanism 62 to fix the lower half hinge 46 at several predetermined angles in relation to the upper half hinge 54. The detent locking mechanism permits the rapid locating and setting of the angles between the boom poles. In the preferred embodiment, the detent angles are 22.5% apart. Other preset angles and other types of locking mechanisms may also be utilized.

With continued reference to FIG. 1, the first receiving face 42 is attached to the second end 22 of the first boom 14. The second boom 66 has a first end 70 and a second end 74 which may be extended in a telescopically from a most contracted length 78 to an extended length 82. The first end 70 of the second boom 66 is attached to the second receiving end 58 of the hollow hinge assembly 38.

With continued reference to FIG. 1, a microphone coupling means 86 is secured to the second end 74 of the second cylindrical telescoping boom 66. An audio cable assembly 90 includes a length of audio cable, a male audio cable coupler 98 fixedly attached to a first cable end, and a female audio cable coupler 106 attached to a second cable end 110. The audio cable 90 is inserted within the hollow interior of the second boom 66, the hollow hinge assembly 38, and the first boom 14. The audio cable male audio coupler 98 is mounted in the handle 34 and the audio cable female audio coupler 106 is mounted in the microphone coupling 86.

The first boom 14 includes an outside pipe 114 with a first end 118, a second end 122, an outer surface 126, and a hollow interior. Several concentric inside pipes 130, 131, 132 each capable of being ensleeved by its corresponding outside pipe 114, 130, 131 make the first hollow cylindrical telescoping boom 14 telescopic. Each inside pipe 130, 131, 132 has a first end 134, 135, 136, a second end 138, 139, 22, an outer surface 142, 143, 144, an inner surface, and a hollow interior. The second end 22 of the last inside pipe 132 is secured to the first receiving end 42 of the hollow hinge assembly 38. A tightening collar 150 with a first end 154, a second end 158, an outer surface 162 and an inner surface 166 is provided. The tightening collar 150 is affixed to the second ends 122, 138, 139 of each outside pipe 114, 130, 131 which the operator uses to secure the position of each pipe against each corresponding ensleeved inside pipes 130, 131, 132. Each inside pipe 130, 131, 132 is capable of being locked into a user-determined telescopic extension length.

In a similar fashion, the second hollow cylindrical telescoping boom 66 includes an outside pipe 170 with a first end 174, a second end 178, an outer surface 182, and a hollow interior. The first end 174 is fixedly secured to the second receiving end 58 of the hollow hinge assembly 38. Inside pipe 186 is ensleeved by corresponding concentric outside pipe 170 making the second hollow cylindrical boom 66 telescopic. Each inside pipe e.g. 186, a first end 194, a second end 74, an outer surface 202, and a hollow interior. A tightening collar 150 having a first end 154, a second end 158, and an outer surface 162 is provided. The tightening collar 150 is affixed to the second end 178, of each outside pipe, e.g. 170 and 186 to provide a locking mechanism setting the positions of the outside pipes and the corresponding inside pipes 186. Each inside pipe 186 is capable of being locked into a length determined by the user.

Figure 2:
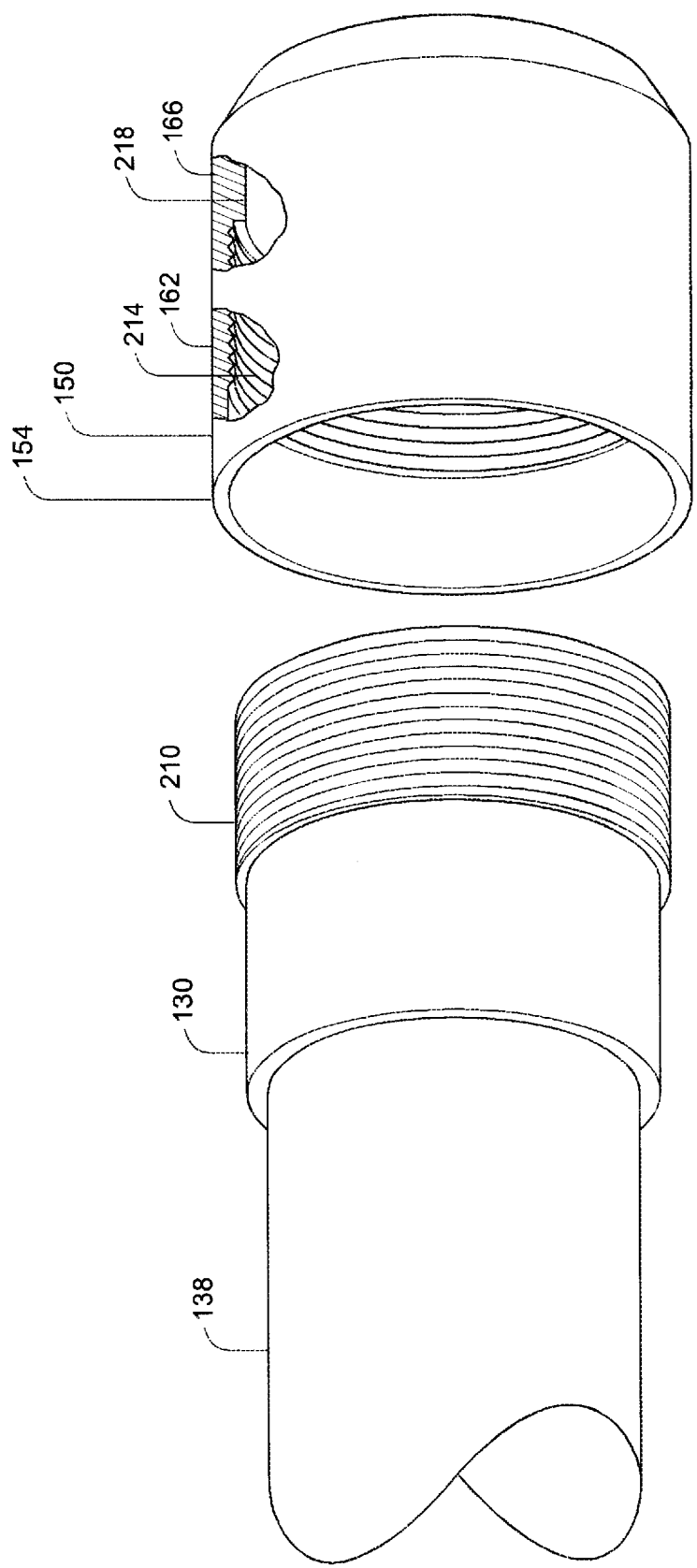
FIG. 2 is a cut-away, perspective view of the portion of the invention indicated in FIG. 1 showing the connection of the poles.

As shown in FIG. 2, the second end 122 of each outside pipe 114, 130, 131 of the first hollow cylindrical telescoping boom 14 has an external male straight threading 210. The first end 154 of the tightening collar 150 has internal female straight threading 214. Each tightening collar 150 retains several collets 218. When the internal female threading 214 of the tightening collar 150 is tightened onto the external male straight threading 210 of the outside pipe 114, the tightening collar 150 compresses the captive collet 218 against the outer surface 142 of the inside pipe 130 thus setting the distance that the inside pipe 130 extends from the outside pipe 114.

Each tightening collar 150 has a dimpled outer surface. The dimpled outer surface is asymmetric and shaped to limit grip torque in the tightening or clockwise direction and increase grip torque in the loosening or counterclockwise direction, thus preventing over-torquing of the tightening collar 150. Without the asymmetric dimples, it can be difficult for the operator to quickly loosen a tightened collar in order to change the boom positions.

Figure 5:
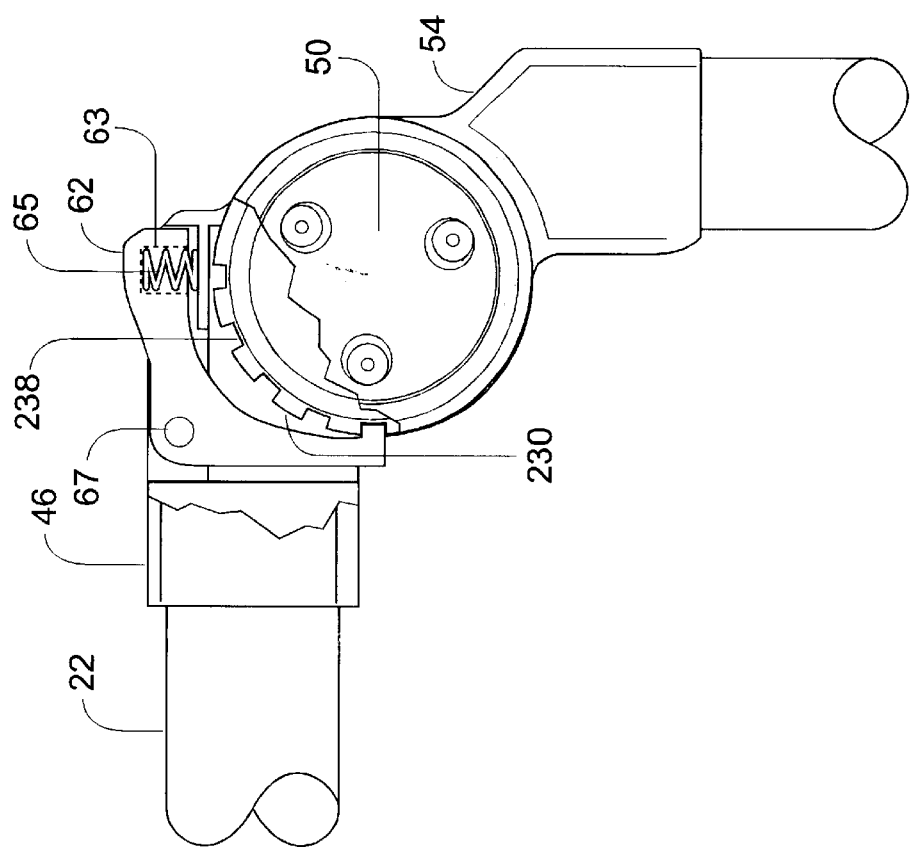
FIG. 5 is a side view of the joint of the articulated joint of the present invention with a cross-sectional cut away.

As shown in FIGS. 3 and 5, the locking detent 62 of the hollow hinge assembly 38 includes a locking detent 62 pivotally attached to the first portion 46 of the hinge assembly 38. Several detent receiving slots 238 are arrayed on the second portion 54 of the hinge assembly 38 for receiving the pawl 230 to provide a number of predetermined articulated hinge locking angles. The pawl 230 is pivotally attached to the pole 46 and is spring-loaded to engage and disengage an individual detent-receiving slot 238. When the pawl 230 is engaged in the slot 238, the hinge assembly 38 is locked in place thereby setting the entire articulated telescopic microphone boom assembly 10 at a predetermined articulated angle.

As shown in FIG. 1, the articulated telescopic microphone boom handle 34 has an outer surface 246, a first end 250 and a second end 254. The first end 250 of the handle 34 ends in a mushroom pole base 258. The mushroom pole base 258 is fabricated from polyurethane. The mushroom pole base permits the addition of other microphone attachments, if desired by the user.

In a preferred embodiment of the invention, the outside pipe 114 and all of the inside pipes 130 of the first hollow cylindrical telescoping boom 14 are constructed from several layers of high-density graphite fiber. The outside pipe 170 and all of the inside pipes 186 of the second hollow cylindrical telescoping boom 66 are also constructed from several layers of high-density graphite fiber. The several layers of high-density graphite fiber are precision ground and are then burnished to reduce handling noise.

We claim:

1. A microphone boom assembly comprising:

two booms including first and second booms, each boom having a first end, a second end and a hollow interior wherein said first end may be extended relative to said second end, elongating each of said booms from a most contracted position to an extended position; a hinge assembly interconnecting said second end of said first boom and said first end of said second boom said hinge having a first half, a second half and a center said first half hinge connected said first end of said second boom and said second half hinge connected to said second end of said first boom wherein said first and second half hinges are pivotally connected to each other, permitting said first boom and said second boom to articulate around said center of said hinge, said hinge further including a locking mechanism for securing said first boom at several predetermined angles in relation to said boom.

2. The microphone boom assembly of claim 1 further including a handle attached to said first boom and, said handle terminating in a mushroom-shaped base.

3. The microphone boom assembly of claim 2, wherein said mushroom-shaped base is fabricated from polyurethane.

4. A microphone boom assembly, comprising:
two booms including a first and second booms, each boom having a first end, a second end and a hollow interior wherein said first end may be extended relative to said second end, said first and second booms elongating from a most contracted position to an extended position;
a hinge assembly interconnecting said first end of said second boom and said second end of said first boom, said hinge having a first half pivotally connected to a second half including a detent locking mechanism for securing said first boom at several predetermined angles in relation to said second boom, and;
a microphone coupling device secured to said second end of said second boom whereby the first and second booms may be set at various angles relative to each other by setting said detent locking mechanism.

5. The microphone boom assembly of claim 4 wherein said first boom further comprises;
a plurality of outside pipes each with a first end, a second end, an outer surface, and a hollow interior;
a plurality of concentric inside pipes which fit within its corresponding outside pipe each said inside pipe has a first end, a second end, an outer surface, an inner surface, and a hollow interior, said second end of the last said inside pipe is secured to a first receiving end of said hinge assembly; and
a mechanism for setting the position of each inside pipe in relation to each of said outside pipes such that the user can determine length of each telescoping boom.

6. The assembly of claim 5 wherein said second boom further comprises:
an outside pipe with a first end, a second end, an outer surface, and a hollow interior, said second end being fixedly secured to a second receiving end of said hollow hinge assembly;
a plurality of concentric inside pipes each capable of being by its corresponding said outside pipe to make said second boom telescopic, each said inside pipe has a first end, a second end, an outer surface, an inner surface, and a hollow interior; and
a tightening collar enclosing said second end of each said outside pipe and including a plurality of collets for setting the relative position of said inside pipes and said outside pipes.

7. The microphone boom assembly of claim 6 wherein said second end of each said outside pipe has external male straight threading, said first end of said tightening collar has internal female straight threading whereby when said internal female threading of said tightening collar is tightened onto said external male straight threading of said outside pipe, said tightening collar compresses said collets against said outer surface of said inside pipe thereby setting said inside pipe relative to said outside pipe in a variety of extension lengths.

8. The microphone boom assembly of claim 7 wherein said second end of each said outside pipe has external male straight threading, said first end of said tightening collar has internal female straight threading, said tightening collar has an asymmetrically-shaped dimples on its surface.

9. The microphone boom assembly of claim 5 wherein said outside pipes and said inside pipes are constructed at least one layer of precision ground, high-density graphite fiber.

10. A microphone boom assembly, comprising:
two booms including a first and second booms, each boom having a first end, a second end and a hollow interior wherein said first end may be extended relative to said second end, elongating from a most contracted position to an extended position;
a hinge assembly interconnecting said first boom and said second boom said hinge having a first half pivotally connected to a second half for securing said first boom at several predetermined angles in relation to said second boom, including a locking mechanism comprising
a detent pivotally attached to said first half of said hinge assembly and a pawl;
a plurality of detent receiving slots for receiving said pawl; with a plurality of predetermined articulated hinge angles, said
wherein said detent is spring-loaded to engaging said detent receiving slots and;
whereby the first and second booms are set at various angles relative to each other by setting said pawl into one of said detent receiving slots.

* * * * *